United States Patent
Gonzales

(10) Patent No.: US 6,374,533 B1
(45) Date of Patent: Apr. 23, 2002

(54) FISH BITE INDICATING APPARATUS

(76) Inventor: Daniel L. Gonzales, 2790 Cottonwood Dr., Denver, CO (US) 80221

( * ) Notice: Subject to any disclaimer, the term of this patent is extended or adjusted under 35 U.S.C. 154(b) by 0 days.

(21) Appl. No.: 09/540,508

(22) Filed: Mar. 31, 2000

(51) Int. Cl.[7] .............................................. A01K 97/12
(52) U.S. Cl. ........................................................ 43/17
(58) Field of Search ................................ 43/17, 17.5

(56) References Cited

U.S. PATENT DOCUMENTS

| | | |
|---|---|---|
| 4,399,631 A | 8/1983 | Smith |
| 4,586,284 A | 5/1986 | Westwood, III |
| 5,182,873 A | 2/1993 | Aragon, Jr. |
| 5,228,228 A | 7/1993 | Meissner |
| D346,007 S | 4/1994 | Barkley, Jr. |
| 5,396,726 A | 3/1995 | Zepeda, Sr. |
| 5,867,931 A * | 2/1999 | Morris ........................ 43/17 |
| 5,894,691 A * | 4/1999 | Zepeda, Sr. ................. 43/17 |
| 5,943,808 A * | 8/1999 | Bryant ........................ 43/17 |
| 5,996,268 A * | 12/1999 | Buczkowski et al. ....... 43/17 |

* cited by examiner

*Primary Examiner*—Kurt Rowan

(57) ABSTRACT

A fish bite indicating apparatus for alerting a user of a fish bite. The fish bite indicating apparatus includes a fishing rod. The fishing rod has a pole portion and a handle portion. A capsule has dimensions adapted to fit in the handle portion. The capsule has a first end and a second end. The first end has a light bulb therein. The capsule has a power source therein for powering the light bulb. An actuating means turns on the light bulb. The actuating means is mounted in the handle portion. A saddle has a top portion and a bottom portion. The bottom portion has an annular groove therein. The top portion has a cavity therein. The cavity has a pin mounted therein, and the pin has a longitudinal axis is orientated generally parallel to an axis of the annular groove. A trigger for sliding on the pin is slidably mounted on the pin. A tension line connects the actuating means to the trigger.

8 Claims, 3 Drawing Sheets

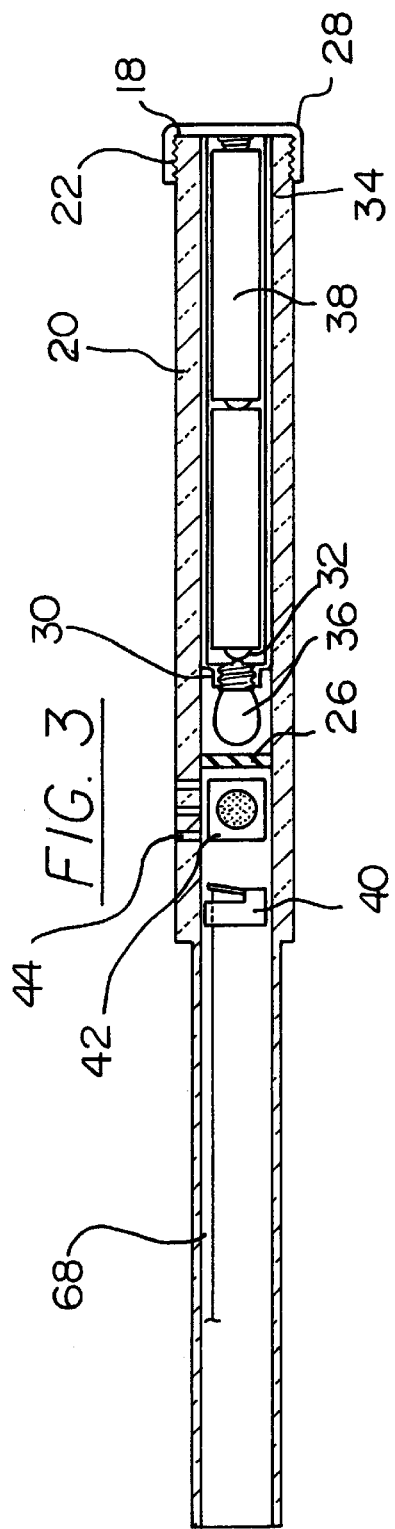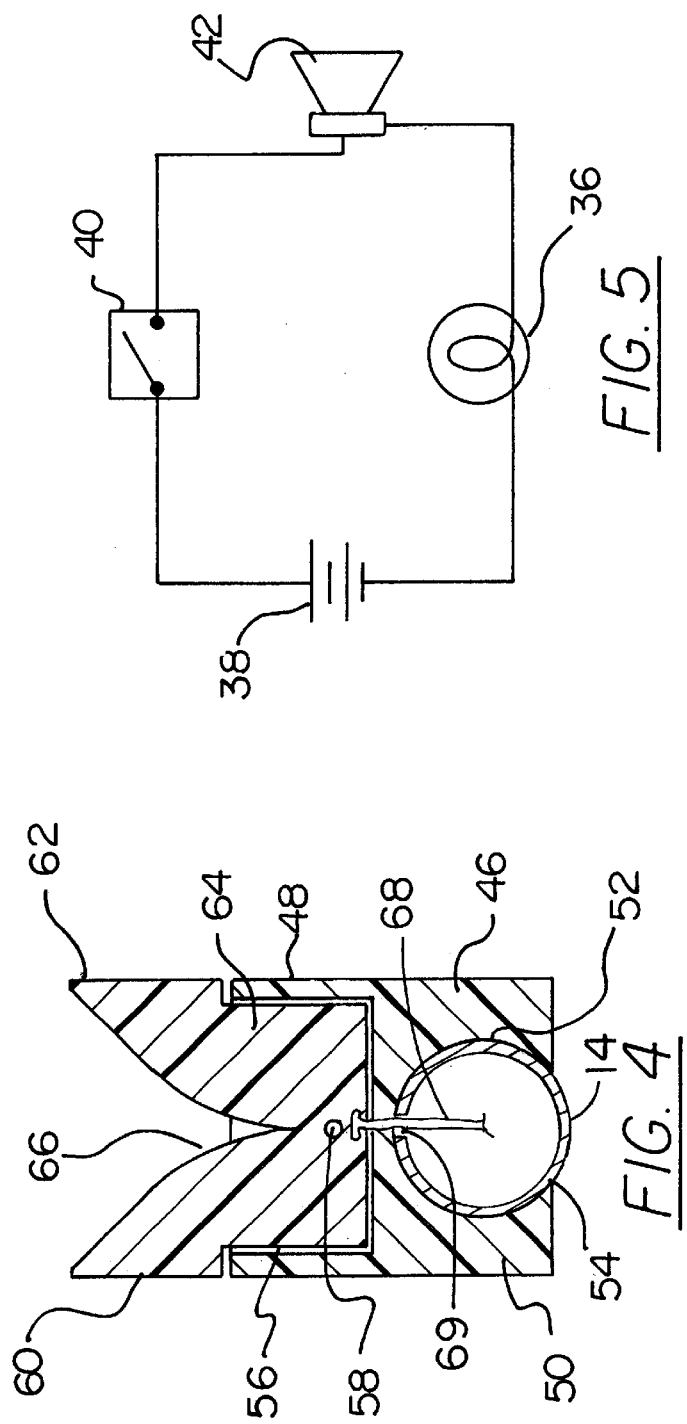

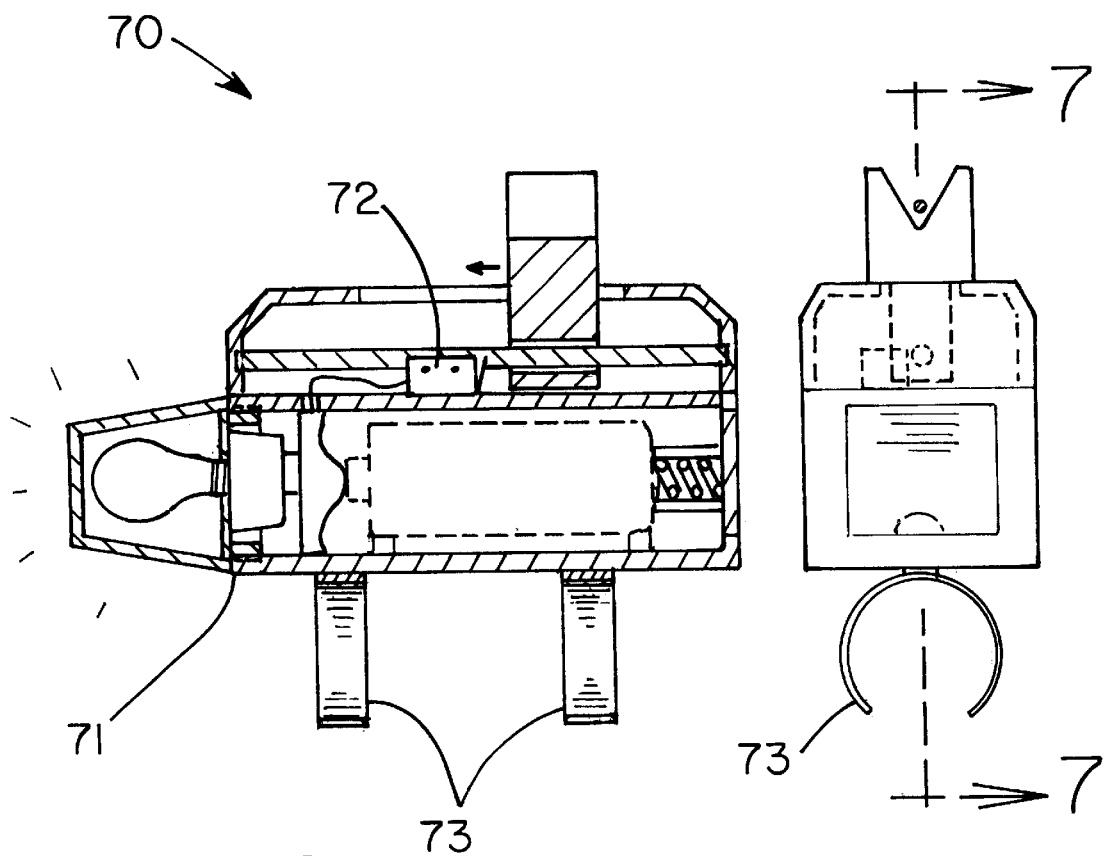

FISH BITE INDICATING APPARATUS

BACKGROUND OF THE INVENTION

1. Field of the Invention

The present invention relates to fish bite indicators and more particularly pertains to a new fish bite indicating apparatus for alerting a user of a fish bite.

2. Description of the Prior Art

The use of fish bite indicators is known in the prior art. More specifically, fish bite indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,228,228; 5,396,726; 4,586,284; 4,399,631; 5,182,873; and 346,007.

While these devices fulfill their respective, particular objectives and requirements, the aforementioned patents do not disclose a new fish bite indicating apparatus. The inventive device includes a fishing rod. The fishing rod has a pole portion and a handle portion. A capsule has dimensions adapted to fit in the handle portion. The capsule has a first end and a second end. The first end has a light bulb therein. The capsule has a power source therein for powering the light bulb. An actuating means turns on the light bulb. The actuating means is mounted in the handle portion. A saddle has a top portion and a bottom portion. The bottom portion has an annular groove therein. The top portion has a cavity therein. The cavity has a pin mounted therein, and the pin has a longitudinal axis is orientated generally parallel to an axis of the annular groove. A trigger for sliding on the pin is slidably mounted on the pin. A tension line connects the actuating means to the trigger.

In these respects, the fish bite indicating apparatus according to the present invention substantially departs from the conventional concepts and designs of the prior art, and in so doing provides an apparatus primarily developed for the purpose of alerting a user of a fish bite.

SUMMARY OF THE INVENTION

In view of the foregoing disadvantages inherent in the known types of fish bite indicators now present in the prior art, the present invention provides a new fish bite indicating apparatus construction wherein the same can be utilized for alerting a user of a fish bite.

The general purpose of the present invention, which will be described subsequently in greater detail, is to provide a new fish bite indicating apparatus apparatus and method which has many of the advantages of the fish bite indicators mentioned heretofore and many novel features that result in a new fish bite indicating apparatus which is not anticipated, rendered obvious, suggested, or even implied by any of the prior art fish bite indicators, either alone or in any combination thereof.

To attain this, the present invention generally comprises a fishing rod. The fishing rod has a pole portion and a handle portion. A capsule has dimensions adapted to fit in the handle portion. The capsule has a first end and a second end. The first end has a light bulb therein. The capsule has a power source therein for powering the light bulb. An actuating means turns on the light bulb. The actuating means is mounted in the handle portion. A saddle has a top portion and a bottom portion. The bottom portion has an annular groove therein. The top portion has a cavity therein. The cavity has a pin mounted therein, and the pin has a longitudinal axis is orientated generally parallel to an axis of the annular groove. A trigger for sliding on the pin is slidably mounted on the pin. A tension line connects the actuating means to the trigger.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish bite indicating apparatus apparatus and method which has many of the advantages of the fish bite indicators mentioned heretofore and many novel features that result in a new fish bite indicating apparatus which is not anticipated, rendered obvious, suggested, or even implied by any of the prior art fish bite indicators, either alone or in any combination thereof.

It is another object of the present invention to provide a new fish bite indicating apparatus which may be easily and efficiently manufactured and marketed.

It is a further object of the present invention to provide a new fish bite indicating apparatus which is of a durable and reliable construction.

An even further object of the present invention is to provide a new fish bite indicating apparatus which is susceptible of a low cost of manufacture with regard to both materials and labor, and which accordingly is then susceptible of low prices of sale to the consuming public, thereby making such fish bite indicating apparatus economically available to the buying public.

Still yet another object of the present invention is to provide a new fish bite indicating apparatus which provides in the apparatuses and methods of the prior art some of the advantages thereof, while simultaneously overcoming some of the disadvantages normally associated therewith.

Still another object of the present invention is to provide a new fish bite indicating apparatus for alerting a user of a fish bite.

Yet another object of the present invention is to provide a new fish bite indicating apparatus which includes a fishing rod. The fishing rod has a pole portion and a handle portion. A capsule has dimensions adapted to fit in the handle portion. The capsule has a first end and a second end. The first end has a light bulb therein. The capsule has a power source therein for powering the light bulb. An actuating means turns on the light bulb. The actuating means is mounted in the handle portion. A saddle has a top portion and a bottom portion. The bottom portion has an annular groove therein. The top portion has a cavity therein. The cavity has a pin mounted therein, and the pin has a longitudinal axis is orientated generally parallel to an axis of the annular groove. A trigger for sliding on the pin is slidably mounted on the pin. A tension line connects the actuating means to the trigger.

Still yet another object of the present invention is to provide a new fish bite indicating apparatus that has a light which will illuminate a portion of the handle when a fish bite is detected.

Even still another object of the present invention is to provide a new fish bite indicating apparatus that has a speaker to alert a user of a fish bite.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross-sectional view taken along line 3—3 of the present invention.

FIG. 4 is a schematic cross-sectional view taken along line 4—4 of the present invention.

FIG. 5 is an electronic schematic of the present invention.

FIG. 6 is an end view of the second embodiment.

FIG. 7 is a side view of the second embodiment.

DESCRIPTION OF THE PREFERRED EMBODIMENT

Figure 1:
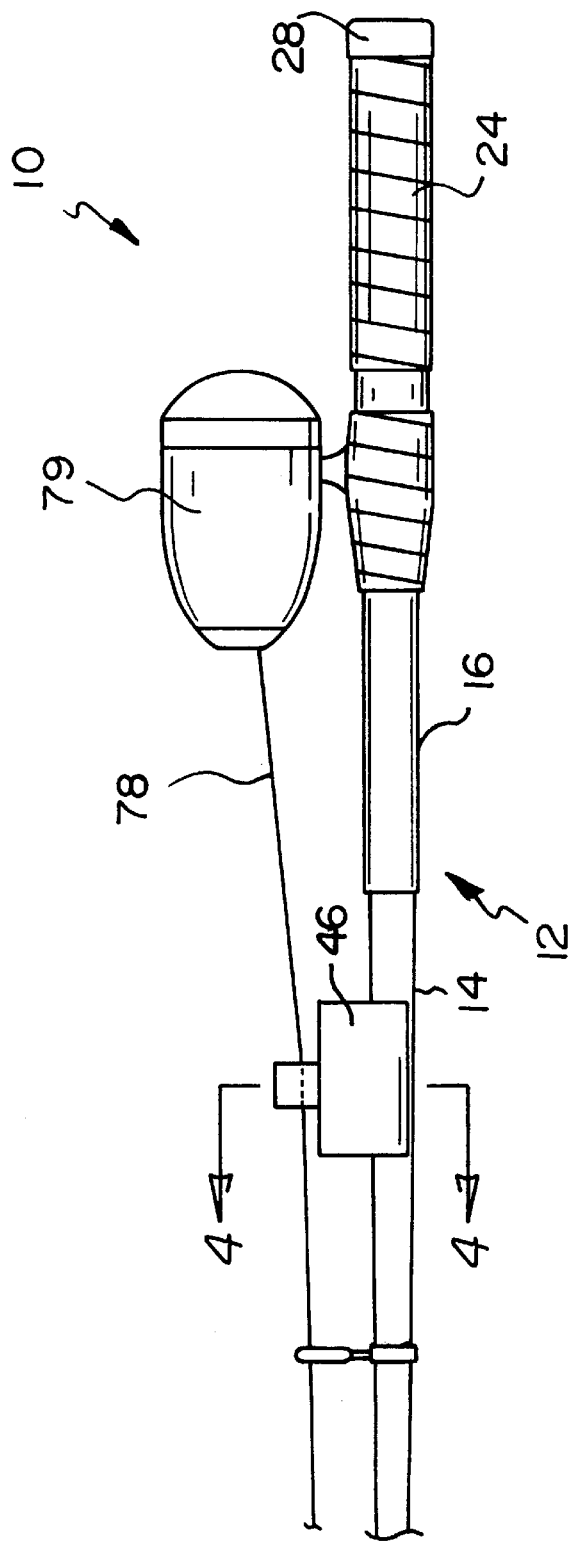
FIG. 1 is a schematic side view of a new fish bite indicating apparatus according to the present invention.
Figure 2:
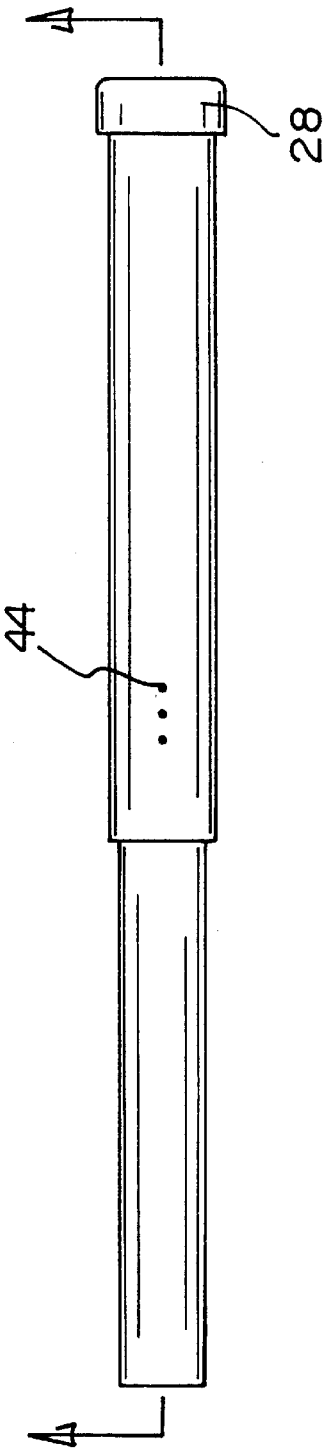
FIG. 2 is a schematic side view of the present invention.

With reference now to the drawings, and in particular to FIGS. 1 through 5 thereof, a new fish bite indicating apparatus embodying the principles and concepts of the present invention and generally designated by the reference numeral 10 will be described.

As best illustrated in FIGS. 1 through 5, the fish bite indicating apparatus 10 generally comprises a fishing rod 12. The fishing rod 12 has a pole portion 14 and a handle portion 16. The fishing rod 12 is substantially hollow. The handle portion 16 has an open end 18. Ideally the handle portion 16 is translucent and is made from a plastic or fiberglass. The handle portion 16 has an exterior surface 20. The exterior surface 20 of the handle portion 16 has threads therein 22, which are located generally adjacent to the open end 18 of the handle portion 16. The handle portion may be wrapped with tape 24 or covered with any material known in the art to provide gripping of the handle portion. Any covering should allow a portion of exposed handle.

An interior wall 26 is within of the handle portion 16. The interior wall 26 is located between the open end 18 and pole portion 14.

A covering member 28 removably covers the open end 18 of the handle portion 16. The covering member 28 is a cap having threads therein for removably coupling to the threads 22 on the handle portion 16.

A capsule 30 has dimensions adapted to fit in the handle portion 16 between the interior wall 26 and the open end 18. The capsule 30 has a first end 32 and a second end 34. The first end 32 has a light bulb 36 therein. The second end 34 is open, and the capsule 30 has a power source 38 therein for powering the light bulb 36. The power source 38 is preferably two batteries. The power source is operationally coupled to the light bulb 36.

An actuating means 40 turns on the light bulb 36. The actuating means 40 is mounted in the handle portion 16, and is located between the interior wall 26 and the pole portion 14. The actuating means 40 is operationally coupled to the power source 38.

A speaker 42 for producing a sound is located between the interior wall 26 and the actuating means 40. The speaker 42 is operationally coupled to the power source 38 and the actuating means 40.

A plurality of bores 44 in the handle portion 16 is generally adjacent to the speaker 42 for permitting sound produced by the speaker 42 to exit the fishing rod 12. The plurality of bores 44 is ideally three bores.

A saddle 46 has a top portion 48 and a bottom portion 50. The bottom portion 50 has an annular groove 52 therein. The groove 52 has a pair of opposed fingers 54 for gripping the exterior surface of the pole portion 14. The top portion 48 has a cavity 56 therein. The cavity 56 has a pin 58 mounted therein. The pin 58 has a longitudinal axis is orientated generally parallel to an axis of the annular groove 52.

A trigger 60 slides on the pin 58. The trigger 60 has a top section 62 and a bottom section 64. The bottom section 64 has a shape adapted for sliding in the cavity 56. The bottom section 64 has a bore therein for receiving the pin 58. The top section 64 has a slot 66 therein for receiving a portion of the fishing line 78 from the reel 79. The slot 66 has a V-shape.

A tension line 68 extends through an aperture 69 in the pole portion 14 and connects the actuating means 40 to the trigger 60. The tension line 68 has a first end and a second end. The first end is fixedly coupled to the actuating means 40. The second end is fixedly coupled to the bottom section 64 of the trigger 60.

A second embodiment 70 is depicted in FIGS. 6 and 7. The second embodiment includes a housing 71, which may be mounted to a fishing pole. The housing 71 generally contains the components of the capsule of the first embodiment. One of the differences is found in the actuating means 72. The trigger strikes the actuating means 72 of the second embodiment as it slides on the pin. The fishing line runs through the trigger and when the line is pulled out, the trigger hits the actuating means 72, which turns on the light. The housing 71 is generally hollow and has a top side and a bottom side. The housing has an exterior surface. The exterior surface of the bottom side has clips 73 thereon adapted for removably coupling to the fishing pole. Ideally there are 2 clips though the number could be one or a plurality.

In use, fishing line 78 from the fishing reel 79 is placed in the slot 66 in the trigger 60. The trigger 60 is slid toward the handle portion 16 such that the tension line 68 may be pulled taught when the fishing line is pulled away from the handle portion by the biting fish. The tension line actuates the actuating means 40. The actuating means turns on the light 36 and the speaker 44 to signal a fish bite.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish bite indicating apparatus, a fishing reel being removably mountable on said apparatus, said apparatus comprising:
    a fishing rod, said fishing rod having a pole portion and a handle portion;
    a capsule, said capsule having dimensions adapted to fit in said handle portion, said capsule having a first end and a second end, said first end having a light bulb therein, said capsule having a power source therein for powering said light bulb;
    an actuating means for turning on said light bulb, said actuating means being mounted in said handle portion;
    a saddle having a top portion and a bottom portion, said bottom portion having an annular groove therein for positioning said pole portion therein, said top portion having a cavity therein, said cavity having a pin mounted therein, said pin having a longitudinal axis being orientated generally parallel to an axis of said annular groove;
    a trigger for sliding on said pin, said trigger being slidably mounted on said pin;
    a tension line for connecting said actuating means to said trigger; and
    wherein fishing line from the fishing reel attached to said trigger, wherein said trigger is slid toward said handle portion such that said tension line may be pulled taught when the fishing line is pulled away from said handle portion, wherein said tension line actuates said actuating means.

2. The fish bite indicating apparatus as in claim 1, additionally comprising:
    said fishing rod being substantially hollow, said handle portion having an open end, said handle portion being translucent, said handle portion having an exterior surface, said exterior surface of said handle portion having threads therein, said threads being located generally adjacent to said open end of said handle portion; and
    a covering member for removably covering said open end of said handle portion, said covering member being a cap having threads therein for removably coupling to said threads on said handle portion.

3. The fish bite indicating apparatus as in claim 1, further comprising:
    a speaker for producing a sound, said speaker being located between said interior wall and said actuating means, said speaker being operationally coupled to said power source and said actuating means.

4. The fish bite indicating apparatus as in claim 3, further comprising:
    a plurality of bores in said handle portion, said bores being generally adjacent to said speaker for permitting sound produced by said speaker to exit said fishing rod.

5. The fish bite indicating apparatus as in claim 1, wherein said trigger has a top section and a bottom section, said bottom section having a shape adapted for sliding in said cavity, said bottom section having a bore therein for receiving said pin, said top section having a slot therein, said slot having a V-shape.

6. The fish bite indicating apparatus as in claim 5, wherein said tension line has a first end and a second end, said first end being fixedly coupled to said actuating means, said second end being fixedly coupled to said bottom section of said trigger.

7. A fish bite indicating apparatus, a fishing reel being removably mountable on said apparatus, said apparatus comprising:
    a fishing rod, said fishing rod having a pole portion and a handle portion, said fishing rod being substantially hollow, said handle portion having an open end, said handle portion being translucent, said handle portion having an exterior surface, said exterior surface of said handle portion having threads therein, said threads being located generally adjacent to said open end of said handle portion;
    an interior wall, said interior wall being within of said handle portion, said interior wall being located between said open end and pole portion;
    a covering member for removably covering said open end of said handle portion, said covering member being a cap having threads therein for removably coupling to said threads on said handle portion;
    a capsule, said capsule having dimensions adapted to fit in said handle portion between said interior wall and said open end, said capsule having a first end and a second end, said first end having a light bulb therein, said second end being open, said capsule having a power source therein for powering said light bulb, said power source being two batteries, said power source being operationally coupled to said light bulb;
    an actuating means for turning on said light bulb, said actuating means being mounted in said handle portion, said actuating means being located between said interior wall and said pole portion, said actuating means being operationally coupled to said power source;
    a speaker for producing a sound, said speaker being located between said interior wall and said actuating means, said speaker being operationally coupled to said power source and said actuating means;

a plurality of bores in said handle portion, said bores being generally adjacent to said speaker for permitting sound produced by said speaker to exit said fishing rod, said plurality of bores being three bores;

a saddle, said saddle having a top portion and a bottom portion, said bottom portion having an annular groove therein, said groove having a pair of opposed fingers for gripping said exterior surface of said pole portion, said top portion having a cavity therein, said cavity having a pin mounted therein, said pin having a longitudinal axis being orientated generally parallel to an axis of said annular groove;

a trigger for sliding on said pin, said trigger having a top section and a bottom section, said bottom section having a shape adapted for sliding in said cavity, said bottom section having a bore therein for receiving said pin, said top section having a slot therein, said slot having a V-shape;

a tension line for connecting said actuating means to said trigger, said tension line having a first end and a second end, said first end being fixedly coupled to said actuating means, said second end being fixedly coupled to said bottom section of said trigger;

wherein fishing line from the fishing reel is placed in said slot in said trigger, wherein said trigger is slid toward said handle portion such that said tension line may be pulled taught when the fishing line is pulled away from said handle portion, wherein said tension line actuates said actuating means.

8. A fish bite indicating apparatus, a fishing reel being removably mountable on said apparatus, said apparatus comprising:

a fishing rod, said fishing rod having a pole portion and a handle portion;

a capsule having dimensions adapted to fit in said handle portion, said capsule having a light bulb therein, said capsule having a power source therein for powering said light bulb;

an actuating means for turning on said light bulb being mounted in said fishing rod;

a saddle having a top portion and a bottom portion, said bottom portion being mountable to said pole portion, said top portion having a cavity therein having a longitudinal axis being orientated generally parallel to a longitudinal axis of said fishing rod;

a trigger being slidably mounted in said cavity;

a tension line for connecting said actuating means to said trigger; and wherein fishing line from the fishing reel attached to said trigger, wherein said trigger is slid toward said handle portion such that said tension line may be pulled taught when the fishing line is pulled away from said handle portion, wherein said tension line actuates said actuating means.

* * * * *